C. H. WAITE.
Tickets.

No. 153,507. Patented July 28, 1874.

Witnesses:
L. L. Bond
O. W. Bond

Inventor:
Charles H. Waite

UNITED STATES PATENT OFFICE.

CHARLES H. WAITE, OF CHICAGO, ILLINOIS.

IMPROVEMENT IN TICKETS.

Specification forming part of Letters Patent No. 153,507, dated July 28, 1874; application filed April 14, 1874.

*To all whom it may concern:*

Be it known that I, CHARLES H. WAITE, of the city of Chicago, in the county of Cook and State of Illinois, have invented a new and useful Improvement in Tickets, of which the following is a full description, reference being had to the accompanying drawings, in which—

Figure 1:
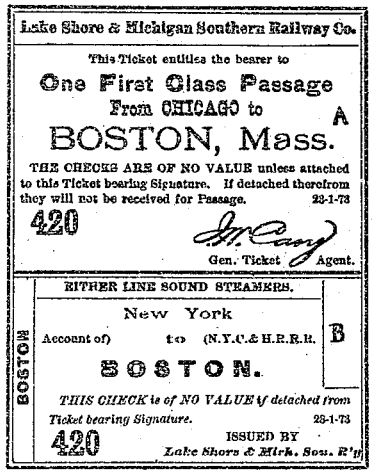
Figure 1:
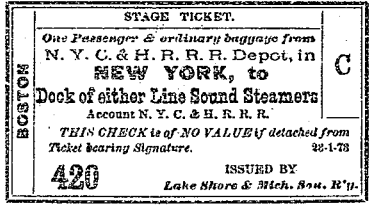
Figure 1:
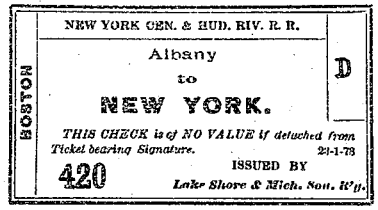
Figure 1:
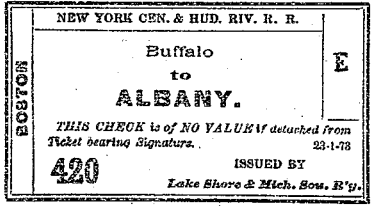
Figure 1:
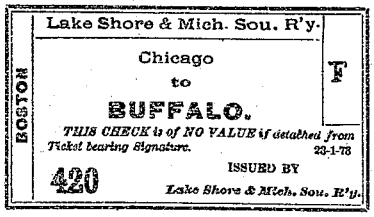
Figure 2:
Figure 2:
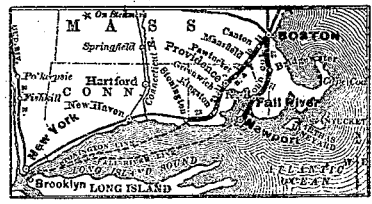
Figure 2:
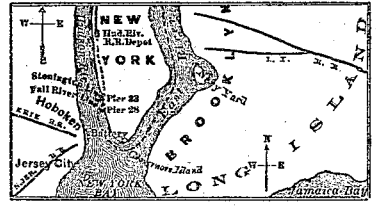
Figure 2:
Figure 2:
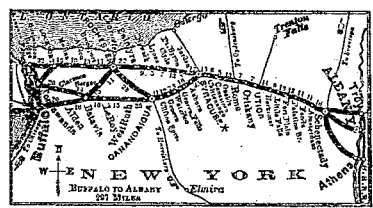
Figure 2:
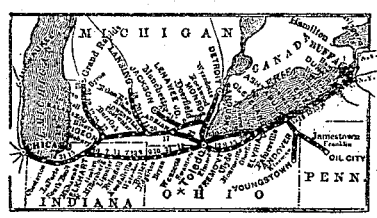

Figure 1 is a face view, and Fig. 2 a back view.

The object of my invention is to furnish each railway or other passenger ticket with a guide combined therewith, so that passengers may know the route covered by each ticket and how much or what portion of any railway or other line of travel is traversed or covered by each ticket or coupon thereof, and also to prevent counterfeiting of railway or other passenger tickets; and its nature consists in providing each ticket and coupon with a map of so much of the route as is covered by each coupon or ticket.

In the drawings, A indicates that portion of the ticket which is usually denominated the contract, and A' the map on the back thereof; B, C, D, E, and F the coupons of a railway ticket from Chicago to Boston via the Lake Shore and Michigan Southern Railway route; and B', C', D', E', and F' the maps upon the backs of the respective coupons. It will be seen that the first coupon, F, in this route is from Chicago to Buffalo. The map on the back thereof shows the line from Chicago to Buffalo, and also shows that the coupon is good on either line of the company issuing the ticket, the two lines being known as the "old line" and the "air-line," as both lines are indicated by the heavy lines of the map. The second coupon, E, is from Buffalo to Albany. The map on the back of this coupon shows the route covered by the coupon, and the ticket can be used from either Buffalo or Suspension Bridge to Albany. The third coupon, D, is from Albany to New York by the Hudson River railroad, and this section of the line is shown upon the back of this coupon; so that the passenger purchasing the ticket will know by this coupon that the route is via New York city, and not by the Albany and Worcester railroad. The fourth coupon, C, is a transfer-ticket from the depot to the piers; the back shows the line of travel and the relative location of the depot and the piers. The fifth coupon, B, is partly by steamboat and partly by rail. The map on the back thereof shows both the Fall River and the Stonington lines, and will be used for whichever line the passenger takes, and also shows the direction of both lines. It will thus be seen that each ticket and each coupon thereof is a complete guide to the route, and for each section of the same. If desired, a miniature map of the whole route may be printed on the back of the contract, A, but I prefer to repeat the map of the line which issued or sold the ticket, as shown at Fig. 2; for then in case the name of the company is torn off in detaching the stub, or is otherwise rendered illegible, the map will still show by what company or section of the line it was issued.

The guide-maps can be printed lengthwise of the tickets, but as this involves so many difficulties of distance, direction, and proportion, and also multiplies the required number of engravings and increases the cost, I do not recommend it for practical use.

The faces of the tickets, as shown at Fig. 1, are printed in any of the usual or well-known modes and forms, and the tickets with their coupons and maps are to be changed as routes are changed or different points are to be reached. The same engraving or map-plate will answer for the same road in each combination, and for either direction, and other means than heavy lines may be used for indicating on the map the particular road or steamboat-line or other line for which the coupon is to be used.

What I claim as new, and desire to secure by Letters Patent, is—

As an improved article of manufacture, a passenger-ticket having a guide-map of so much of the route as is represented by each coupon or ticket, printed on the back thereof, substantially as and for the purposes specified.

CHARLES H. WAITE.

Witnesses:
   L. L. BOND,
   O. W. BOND.